United States Patent [19]

Ault

[11] Patent Number: 4,695,495
[45] Date of Patent: Sep. 22, 1987

[54] HONEYCOMB CORE LOAD BEARING STRUCTURE

[75] Inventor: Robert M. Ault, Westminster, Calif.

[73] Assignee: TRE Corporation, Los Angeles, Calif.

[21] Appl. No.: 716,678

[22] Filed: Mar. 27, 1985

[51] Int. Cl.⁴ .............................................. B32B 3/12
[52] U.S. Cl. ..................................... 428/73; 428/192; 428/593; 52/806
[58] Field of Search ................. 428/73, 116, 117, 118, 428/192, 593; 52/806

[56] References Cited

U.S. PATENT DOCUMENTS

| | | | |
|---|---|---|---|
| 2,644,777 | 7/1953 | Havens | 428/116 |
| 3,108,367 | 10/1963 | Christman | 428/116 X |
| 3,196,533 | 7/1965 | Ida et al. | 428/116 X |
| 3,529,394 | 9/1970 | Wilkins | 52/806 X |
| 3,991,242 | 11/1976 | Tuttle | 428/73 X |
| 4,143,501 | 3/1979 | Tuttle | 52/806 X |
| 4,197,341 | 4/1980 | Rule | 428/119 X |
| 4,223,053 | 9/1980 | Brogan | 428/105 X |

Primary Examiner—Henry F. Epstein
Attorney, Agent, or Firm—Spensley Horn Jubas & Lubitz

[57] ABSTRACT

An improved honeycomb core type load bearing structure having lessened susceptibility to fatigue failure when supported at its edges. The structure includes a plurality of corrugated ribbons forming the core and face members attached opposing lengthwise edges of the core ribbons. Edge members which may be employed for load bearing are attached to edges of the face members. Additional attachment elements are disposed between core ribbon ends abutting the edge members. The attachment elements are joined to both the core ribbons and the face members.

11 Claims, 4 Drawing Figures

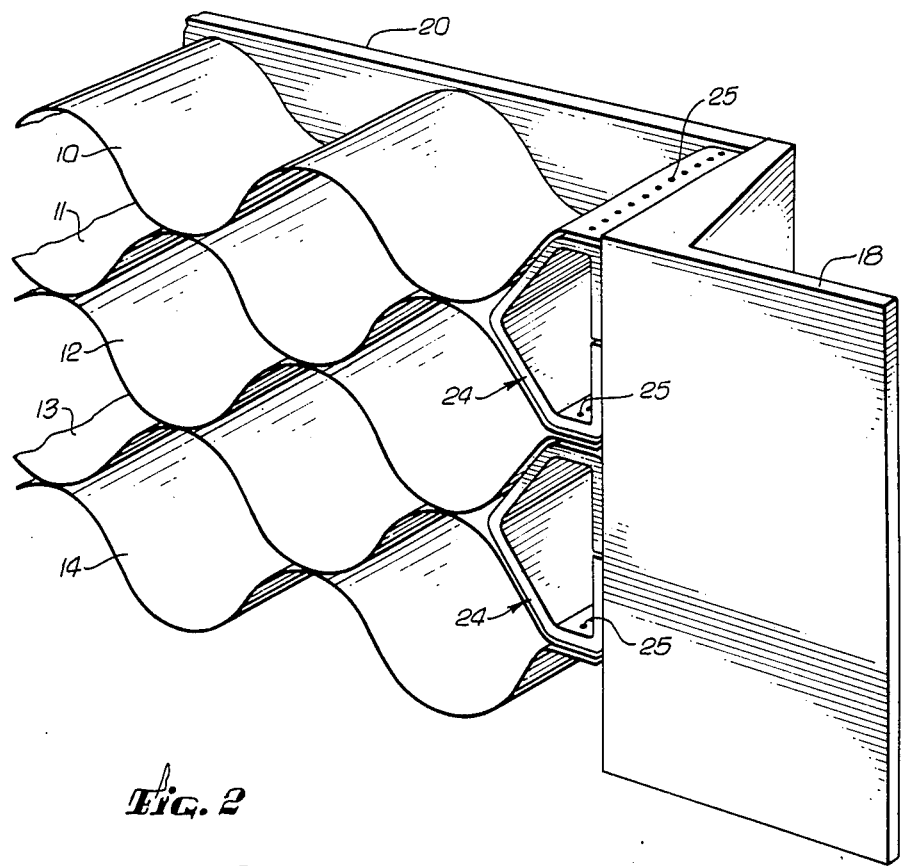
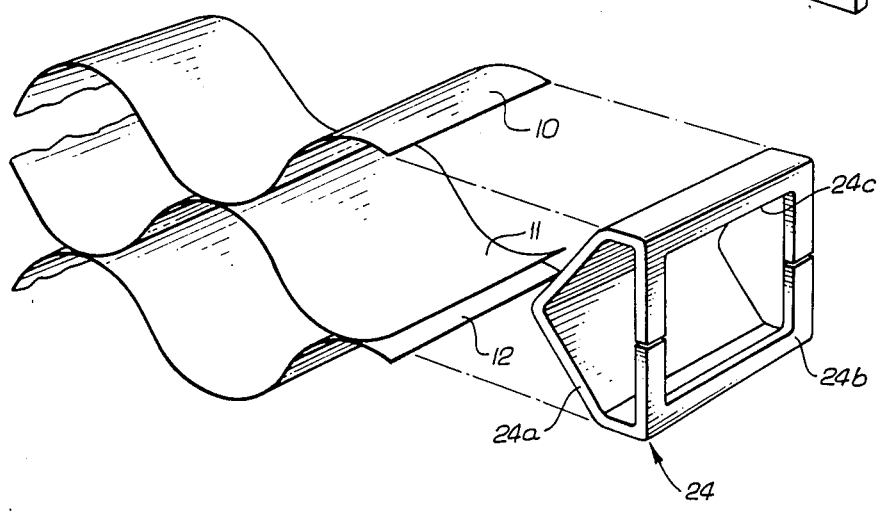

HONEYCOMB CORE LOAD BEARING STRUCTURE

BACKGROUND OF THE INVENTION

1. Field of the Invention

The present invention concerns load bearing structures having a honeycomb type core and more particularly honeycomb type cores in which corrugated core strips are individually attached to opposing face members before interconnection.

2. Description of the Prior Art

Load bearing structures having a honeycomb type core are employed in a diverse number of applications ranging from the space shuttle to battleships. Generally these structures are employed where substantial structural strength and minimum weight are desired. A typical honeycomb core load bearing structure includes a number of corrugated ribbons generally disposed in side by side relationship to form the honeycomb core with two planar face members or sheets attached to the lengthwise edges of the ribbons and two or more edge members attached to the edges of the face members. Often these elements are attached to one another by various welding and brazing techniques. In a number of applications the structure bears a load along one or more edge members. The core ribbons are then generally oriented either perpendicular to or parallel to these load bearing edge members.

Honeycomb core load bearing structures assembled by various welding and brazing techniques can generally be classified into one of two broad categories based on differing methods of fabrication. In one category the core is pre-assembled by first welding a series of alternatingly curved ribbons together to form the core, attaching edge members along edges of the core, and subsequently attaching face members to opposing sides of the core. Load bearing structures of this type enjoy a secure bond between the core and edge member which is important when the structure is supported at its edges. The attachment of the core to the face members, however, is very difficult since the core is not accessible for welding once the face members are positioned for attachment. Failures in this type of honeycomb core load bearing structure typically result due to weaknessess in the bond between the core and the face members.

In the other category, the honeycomb core load bearing structure is assembled by first positioning the face members adjacent one another and then individually inserting and attaching core ribbon elements to the face members, typically by welding. Thus, the honeycomb core is assembled during attachment of the core to the face members. Edge members are subsequently attached to the edges of the face members. With this type of assembly method the core ribbons may or may not be welded together depending on the degree of structural strength desired for the manufacturing cost involved.

While individual welding of core ribbons to the face members provides a superior bond between the core and the face members, the subsequent inaccessibility of the core after positioning the edge members for attachment precludes welding the edge members to the core. When the edge members are used to support this type of structure, a substantial flatwise tension is experienced between the core and one of the face members. This tension acts to pry the face member away from the core. It has been determined that the greatest magnitude of flatwise tension is located immediately adjacent the load bearing edge member. Since the core is not directly attached to the load bearing edge member, the sole load path for this maximum tension is through the end portions of a core ribbon disposed immediately adjacent the load bearing member. This characteristic can cause either dynamic or fatigue failure of the structure by separation of the core from the face members in the immediate proximity to the load bearing edge member. This separation will subsequently propagate towards the center of the core. Typically the structure will fail through separation of a face member from core ribbon ends adjacent a load bearing edge member at loads approximately 65% of those which can be supported by the central portion of the structure.

Previous efforts to avoid failure in this type of honeycomb core structure due to the maximized flatwise tension at the ends of core ribbons disposed adjacent a load bearing edge member have focused primarily on providing thicker load bearing edge members and face members so as to dissipate a greater amount of the flatwise tension into inner portions of the core. This approach, however, provides only a limited increase in the strength of the structure at the cost of an undesirable increase in overall weight. Further, the maximum flatwise tension is still located at the core ribbon ends adjacent the load bearing edge member, resulting in a fatigue failure for a considerably smaller load than that which can be supported by the central portion of the structure.

Thus, there still exists a need for some manner of minimizing the flatwise tension applied to core ribbon ends in immediate proximity to a load bearing edge member.

SUMMARY OF THE INVENTION

It is therefore an object of the present invention to reduce fatigue failure in individually attached honeycomb core structures bearing a load at its edges. It is a further object of the present invention to decrease the flatwise tension experienced by core ribbon ends in proximity to a load bearing edge member.

These and other goals and objectives are accomplished in the present invention by providing an additional support element in contact with and attached to the core ribbon ends adjacent a load bearing edge member. These additional support elements are also attached to the face members. In one presently preferred embodiment, in which the core ribbons are oriented generally perpendicular to a load bearing edge member, the additional support elements are disposed in partial cavities formed by opposing core ribbons. In a second preferred embodiment, in which the core ribbons are oriented generally parallel to a load bearing edge member, additional support elements are configured to generally conform to the alternating curvatures of an outermost core ribbon and reside in a partial cavity formed by the outermost core ribbon and an interior edge of the load bearing edge member.

The novel features which are believed to be characteristic of the present invention, together with further objectives and advantages thereof, will be better understood from the following detailed description considered in connection with the accompanying drawings. It should be expressly understood, however, that the drawings are for purposes of illustration and description only and are not intended as a definition of the limits of the invention.

BRIEF DESCRIPTION OF THE DRAWINGS

FIG. 1 is a perspective view of a of a first preferred embodiment of the present invention showing portions of a load bearing edge member, a face member, several core ribbons, and additional support elements disposed between the core ribbons.

FIG. 2 is a perspective view of a first preferred embodiment of the present invention showing portions of several core ribbons and an additional support element.

DETAILED DESCRIPTION OF THE INVENTION

Figure 3:
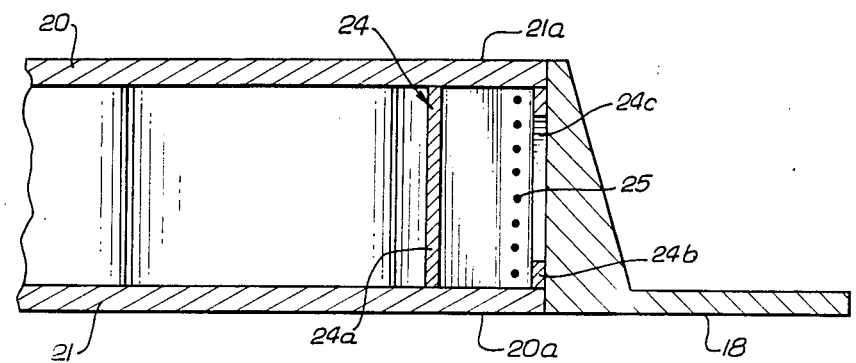
FIG. 3 is a sectional side view of a first preferred embodiment of the present invention.

Referring to the figures and more particularly FIG. 1 thereof there is shown a first preferred embodiment of the present inventive honeycomb core load bearing structure. In this embodiment a plurality of corrugated curved core ribbons such as 10-14 are oriented generally perpendicular to a load bearing edge member 18. The core ribbons 10-14 and the load bearing edge member 18 are both attached to a first face member 20 and a second face member 21 (shown in FIG. 3). An opposing load bearing edge member (not shown) may be attached to the face members 20, 21 at an opposing end of the core.

The core ribbons 10-14 are configured so that, when disposed adjacent one another, opposing ribbons 10, 11 and 12, 13 form partial cavities at the end of the core adjacent the load bearing edge member 18. Additional attachment elements 24, called shear ties, are disposed within each of these partial cavities and attached, typically by welding to both the opposing ribbons 10, 11 and 12, 13 forming core end cavities and the face members 20, 21.

The shear ties 24 provide an alternate load path into the interior of the honeycomb core for flatwise tension introduced to the ribbon ends through the load bearing edge 18 and the face sheets 20, 21. Load forces are communicated through the ends of the shear ties 24 attached to the face members 20, 21 and weld bonds 25 between the core ribbons 10-14 and the shear ties 24. By providing an alternate load path to the central portion of the core, the shear ties 24 reduce the magnitude of flatwise tension applied directly to the core ribbon ends disposed immediately adjacent the load bearing edge member 18.

Use of the shear ties 24 in this embodiment has provided a substantial increase in the strength of the load bearing structure. Fatigue failure of this type of structure ends has been observed to approach maximum loads previously causing fatigue failure only in the central portion the structure.

As shown in FIG. 2, the shear ties 24 have a generally elongated geometry with one side 24a having a cross sectional geometry generally conforming to the curvature of the opposing ribbons such as 10, 11. A second side 24b of the shear ties 24 is generally flat so as to abut the load bearing edge member 18. A cavity 24c is provided to facilitate welding of the shear tie 24 to the opposing ribbons such as 10, 11.

The honeycomb core load bearing structure is fabricated by first positioning the face members 20, 21 and then singly inserting the core ribbons 10-14 and individually attaching each core ribbon to the face members 20, 21. This attachment is usually accomplished by any of a number of suitable welding processes. After a ribbon element is positioned between the face members 20, 21, it may be welded to a previously implaced core ribbon to provide additional structural strength if desired. When all of the ribbons have been inserted between and attached to the face members 20, 21, the shear ties 24 are then inserted into the cavities between opposing core ribbons 10, 11 and 12, 13. The shear ties 24 are then attached to the opposing ribbons 10, 11 and 12, 13, typically by welding. Since the open edges of the shear ties 24 adjacent the face members are no longer accessible, the opening 24c provides a passage for access to the sides of the shear tie 24 for a welding tip. Thereafter, the load bearing edge member 18 is attached to the face members 20, 21. This attachment is typically accomplished by a suitable welding technique such as, for example, fusion welding.

After attachment of the load bearing edge member 18 to the face members 20, 21, the ends of the shear ties 24 are attached to the face members 20, 21. It has been determined that this attachment step can be performed by pulsed arc welding along the outer surface 20a, 21a (FIG. 3) of the respective face members 20, 21 exterior to the shear ties 24. Since the greatest concentration of flatwise tension is encountered in immediate proximity to the load bearing edge member 18, it is advantageous to join the edge of the shear tie side 24b to the abutting load bearing edge member 18. The entire edges of the shear ties 24 adjacent the face members 20, 21 should, however, preferably be joined to the face members 20, 21 to maximize the load communicated to the interior of the core by the shear ties 24 through the weld bonds 25.

Figure 4:
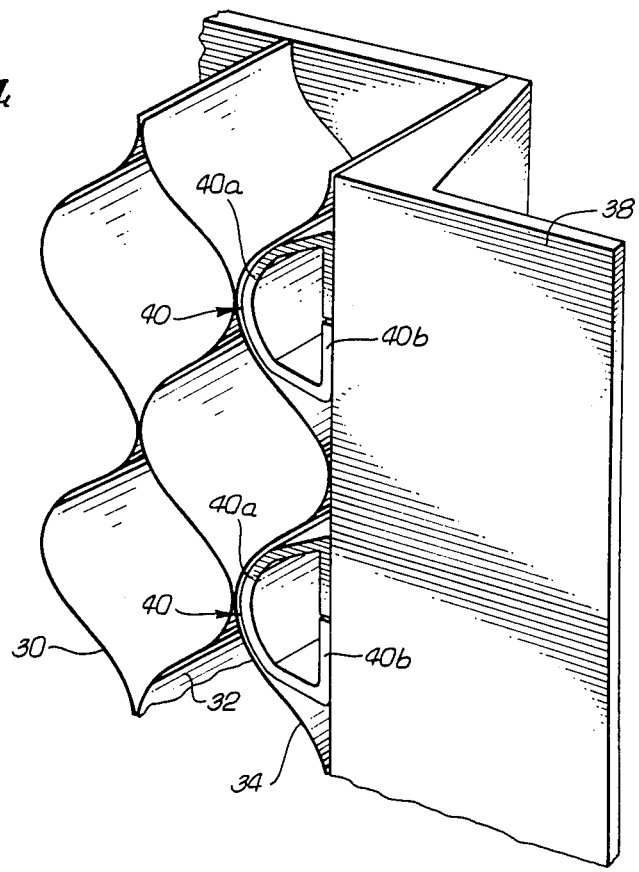
FIG. 4 is a perspective top view of a second preferred embodiment of the present invention.

In this preferred embodiment of the present inventive honeycomb core load bearing structure, the core ribbons 10-14 are oriented generally perpendicular to the load bearing edge member 18. Obviously, however, shear ties could also be employed where the core ribbons are oriented generally parallel to a load bearing edge member. In FIG. 4 a second preferred embodiment of the present invention is shown in which core ribbons 30-34 are oriented generally parallel to a load bearing edge member 38 with shear ties 40 displaced in a series of partial cavities formed between the core ribbon 34 and the load bearing edge member 38. The shear ties 40 have a generally elongated shape and an opening on a side 40b abutting the load bearing edge member 38 similar to the shear tie 24 discussed above. In this embodiment, however, the shear ties 40 have a first side 40a generally conforming to the curvature of the end core ribbon 34. The shear ties 40 are similarly attached along opposing sides of each curve of the ribbon 34 and further attached to first and second face members (not shown). The manner of fabrication of this load bearing structure is the same as that set forth above within the first preferred embodiment.

It will, of course, be understood that modifications of the present invention and its various aspects will be apparent to those skilled in the art. For example, it should be possible to attach the shear ties 24 or 40 to a load bearing edge member by an appropriate brazing technique. Consequently, the scope of the present invention should not be limited by the particular embodiments and examples described herein, but should only be defined by the appended claims and equivalents thereof.

What is claimed is:

1. A honeycomb core load bearing structure comprising:
   a first face member;
   a second face member spaced from and parallel to the first face member;
   a load bearing edge member attached to an edge of each of said first and second face members;
   a plurality of corrugated ribbon core elements disposed between and attached to said first and second face members and forming a honeycomb core, each of said core ribbon elements aligned generally perpendicular to said edge member; and
   a plurality of load distributing attachment elements, one each located in the space between adjacent core elements at the edge member and extending between the first and second face members, wherein each attachment element is attached to the adjacent core elements and further attached to said first and second face members.

2. The honeycomb core load bearing structure of claim 1 wherein said attachment elements are attached to said first and second face members by pulsed arc welding.

3. The honeycomb core load bearing structure of claim 1 wherein said attachment elements are further attached to said load bearing edge member.

4. A honeycomb core load bearing structure comprising:
   a first face member;
   a second face member spaced from and parallel to the first face member;
   a load bearing edge member attached to an edge of each of said first and second face member;
   a plurality of corrugated ribbon core elements disposed between and attached to said first and second face members so as to form a honeycomb core structure, said ribbon elements extending generally parallel to said load bearing edge member; and
   a plurality of load distributing attachment elements, one each located in the space between the edge member and a corrugation of a ribbon element facing the edge member, each attachment element extending between the face members and being attached to the face members and to the ribbon element.

5. The load bearing structure of claim 4 wherein said attachment elements are further attached to said load bearing edge member.

6. The honeycomb core load bearing structure of claim 4 wherein said attachment elements are attached to said first and second face members by pulsed arc welding.

7. A honeycomb core structure comprising:
   a honeycomb core formed of a plurality of parallel corrugated ribbon core elements;
   first and second face sheets attached to opposing honeycomb surfaces of the core;
   an edge member attached to edges of the first and second face sheets along an edge of the core; and
   a plurality of load distributing attachment members located in spaces between the edge member and the edge of the core, each attachment member extending between and having its ends attached to the first and second face sheets and further being attached along its length to the core.

8. A honeycomb core structure as in claim 7 wherein the edge member extends along an edge of the core formed by the edges of plural core elements, wherein each attachment element is located in a space between adjacent core elements and the edge element and is attached to the adjacent core elements.

9. A honeycomb core structure as in claim 7 wherein the edge member extends along an edge of the core formed by a single core element, wherein each attachment element is located in a space between a corrugation of said core elements and the edge member and is attached to the core element.

10. A honeycomb core structure as in claim 7 wherein each attachment element is a hollow member along its length and has a cross-section which generally corresponds to the cross-section of the space within which it is located.

11. A honeycomb core structure as in claim 10 wherein each attachment member includes an opening facing the edge member to provide access to the interior thereof.

* * * * *